3,360,578
CATALYTIC ISOMERIZATION OF CYCLOALKADIENES

Sterling F. Chappel III, Lake Charles, La., assignor to Columbian Carbon Company, New York, N.Y., a corporation of Delaware
No Drawing. Filed Mar. 9, 1965, Ser. No. 438,423
15 Claims. (Cl. 260—666)

This invention is concerned with a process for the catalytic isomerization of cycloalkadienes to isomers of a more thermodynamically favored energy state.

More specifically, the process of the present invention is concerned with the catalytic isomerization of a cycloalkadiene having an empirical formula of $C_nHR_{2n-5}$ wherein $n$ is an integer having a value of from 6 to 12 inclusive and R is a member selected from the group consisting of hydrogen and lower alkyl radicals, in the presence of an alkaline earth metal amide catalyst.

The cycloalkadienes, which may be isomerized to isomers having a more thermodynamically favored energy state according to the subject process, correspond to the following general structural formula:

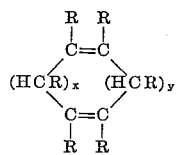

wherein R has the meaning given above, $x$ and $y$ are numbers, the sum of which is equal to $n-4$, and $n$, as above, is an integer having a value of from 6 to 12 inclusive.

For those cycloalkadienes having from six to eight carbon atoms and the cycloalkadienes having twelve carbon atoms, the more thermodynamically favored energy state is the conjugated form of the cycloalkadiene, i.e. with reference to the above formulas, when $n$ is 6, 7, 8 or 12, $x$ or $y$ is 1. With those cycloalkadienes having from nine to eleven carbon atoms, due to steric effects the more favored energy form is not the conjugated form but rather an unconjugated form. Thus, the more favored energy state of the cyclononadienes is the 1,5-cyclononadiene, for the cyclodecadienes the energy state is 1,6-cyclodecadiene, and for the cycloundecadienes it is 1,4-cycloundecadiene at about 30° C., while it is the 1,5 isomer at about 120° C.

The catalytic material used to effect the subject isomerization reaction is a substituted or unsubstituted alkaline earth metal amide, wherein the alkaline earth metal is a member selected from the group consisting of calcium, strontium and barium.

One of the age old problems of industrial synthetic organic chemistry is the search for a suitable method for the conversion of abundant hydrocarbons into less abundant, more useful and desirable, oxygen containing derivations of these hydrocarbons. The prior art abounds with a multiude of proposed methods to accomplish these desired results.

One of the problems associated with the conversion of hydrocarbons into their more useful derivations, involves the positioning of unsaturation present in the molecule into the most desirable position for further synthetic work. For example, commercial utility of 1,3-butadiene had, until recently, been limited to use in high molecular weight elastomers and protective coatings. However, with the work of Reed (J. Chem. Soc. 1954 1931) and others on the cyclic olegomerization of 1,3-butadiene to form the corresponding 1,5-cyclooctadienes and 1,5,9-cyclododecatrienes and used in conjunction with the oxygenation process described in my copending application S/N 321,673 filed November 6, 1963, it became possible to convert these hydrocarbons into oxygen derivatives having utility as high boiling alcohols and ketones, and, additionally serving as the basis for the preparation of polyamide resins. One important step in the above described conversion is the isomerization of the 1,5-cyclooctadiene or the 1,5-cyclododecadiene into its more favored energy form, the conjugated form, 1,3-cyclooctadiene or 1,3-cyclododecadiene used as the starting material in the process of the above cited copending application. A process for this isomerization step is provided by the process of the subject invention.

As applied to all of the subject cycloalkadienes, the subject process provides for their conversion into their more or less reactive isomers prior to effecting such transformations as hydrogenation, halogenation, hydrohalogenation, epoxidation, ozonization, etc.

In essence the subject isomerization process is conducted by contacting under isomerizing conditions the cycloalkadiene or a solution of the cycloalkadiene in an inert ether or an aliphatic saturated hydrocarbon solvent with the isomerization catalyst. The alkaline earth metal amide isomerization catalysts operable in the subject process correspond to the following general formula:

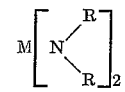

wherein M is an alkaline earth metal selected from the group consisting of calcium, strontium and barium and R is a member selected from the group consisting of hydrogen, alkyl radicals having from one to twelve carbon atoms, amino substituted alkyl radicals of up to twelve carbon atoms, cycloalkyl radicals having from five to twelve carbon atoms, and amino substituted cycloalkyl radicals of up to twelve carbon atoms.

The period of contact between the cycloalkadiene to be isomerized and the isomerization catalyst is variable, it being principally a function of reaction temperature and ratio of catalyst to cycloalkadiene. The useful and preferred reaction temperatures, ratio of catalyst to cycloalkadiene, and each of the other above-mentioned aspects of the invention are discussed more fully below.

A clearer understanding of the new isomerization process may be obtained from the examples given below, which disclose the presently preferred mode of carrying out this invention.

EXAMPLE I

Calcium amide [$Ca(NH_2)_2$] was prepared by adding 80 grams (2 moles) of calcium turnings portionwise to a flask containing liquid ammonia. The flask was immersed in a Dry Ice-acetone bath and was fitted with a stirrer, Dry Ice-acetone condenser and an ammonia inlet tube. Atmospheric moisture was excluded from the system by a barium oxide drying tube. After addition of the calcium turnings was completed, the mixture was stirred slowly to insure complete solution of the calcium. The cooling bath was then removed and the excess ammonia was allowed to evaporate. The flask containing the blue pasty calcium hexammoniate was placed in a dry box which was flushed with nitrogen. After standing for three days, the reaction flask was broken and with the rapid evolution of ammonia the blue pasty composition changed to a fine gray powder.

Twenty-five grams (0.33 mole) of calcium amide, which had been prepared as described above, was added to 150 grams (1.39 moles) of 1,5-cyclooctadiene contained in a reactor equipped with a reflux condenser. The reaction mixture was heated at reflux temperature (approximately 155° C.) for about 16 hours. After cooling, the solid catalytic material was separated from the liquid hydrocarbon product, by filtration and the product was analyzed by vapor phase chromatography. This analysis indicated the presence of 97.4% 1,3-cyclooctadiene, 0.2% 1,5-cyclooctadiene and 2.4% other material.

EXAMPLE II

Use of cis, trans-1,5-cyclodecadiene in the process of Example I will result in the formation of substantial quantities of cis, cis-1,6-cyclodecadiene.

EXAMPLE III

Substitution of 1,5-dimethyl-1,5-cyclooctadiene for the 1,5-cyclooctadiene in the process of Example I, will yield considerable quantities of 1,5-dimethyl-1,3-cyclooctadiene.

EXAMPLE IV

When the 1,5-cyclooctadiene of Example I is replaced by 1,5-dimethyl-1,5-cyclododecadiene or 1,2,5,6-tetramethyl-1,5-cyclododecadiene, a good yield of 1,5-dimethyl-1,3-cyclododecadiene or 1,2,5,6-tetramethyl-1,3-cyclododecadiene will be obtained.

Substitution of the following cycloalkadienes, 1,3,5-triethyl-1,4-cyclohexadiene; 1,2,3,4,5,6 - hexamethyl - 1,4-cyclohexadiene; 1,2-dimethyl-1,4-cyclononadiene; 1-methyl-1,3-cycloundecadiene; 1,4-cycloheptadiene; 1,2,3,4,5,7,7,8,8-nonamethyl-1,5-cyclooctadiene; or 1,2,3,4,5,6,7,8-octamethyl-1,4-cyclooctadiene, for the 1,5-cyclooctadiene of Example I will yield respectfully substantial quantities of 1,3,5-triethyl-1,3-cyclohexadiene; 1,2,3,4,5,6-hexamethyl-1,3-cyclohexadiene; 1,2-dimethyl - 1,5 - cyclononadiene; 1-methyl-1,4-cycloundecadiene; 1,3-cycloheptadiene, 1,2,3,4,5,7,7,8,8-nonamethyl-1,3-cyclooctadiene; or 1,2,3,4,5,6,7,8-octamethyl-1,3-cyclooctadiene.

The subject isomerization process may be effected at a variety of reaction temperatures. Useful reaction temperatures vary from about −25° C. to about 150° C., the normal boiling point of 1,5-cyclooctadiene, and if pressure is applied higher temperatures are of benefit. The preferred reaction temperature for a continuous type reaction is from about 100° C. to about 140° C. When the reaction is conducted batch-wise the normal reflux temperature of approximately 150° C. is the preferred reaction temperature. Higher reaction temperatures may be used and the reaction effected in the vapor phase. However, with higher reaction temperatures the possibility of ring collapse of the cycloalkadiene carbocyclic ring to a bicyclic ring structure is increased and therefore reaction temperatures above the normal boiling point are not preferred. If the reaction is to be effected in the vapor phase the use of pressures less than atmospheric pressure is advised.

Suitable isomerization catalysts which are useful in the subject process comprise the substituted and unsubstituted alkaline earth metal amides. These alkaline earth metal amides correspond to the following general formula:

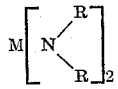

wherein M is an alkaline earth metal selected from the group consisting of calcium, strontium and barium, and R is a member selected from the group consisting of hydrogen, alkyl radical containing from one to twelve carbon atoms, amino substituted alkyl radicals, cycloalkyl radical containing from five to twelve cyclic carbon atoms and amino substituted cycloalkyl radical.

Suitable alkyl radicals include those having from one to twelve carbon atoms. These carbon atoms may be incorporated in a straight chain radical, for example, as in the methyl, ethyl, n-butyl, n-octyl, n-decyl and n-dodecyl radicals or the alkyl radical may be a branched chain radical as for example, iso-propyl, t-butyl, neo-pentyl and 2-ethylhexyl.

The term "amino substituted alkyl radicals" as used herein and in the appended claims is used to define an alkyl radical containing from one to twelve carbon atoms as defined above, wherein an amino group has been substituted for one of the hydrogens. The amino group may be further substituted. Thus, the amino substituted alkyl radical corresponds to the following general formula:

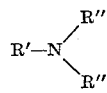

wherein R' is the alkylene radical corresponding to the alkyl radical as above defined and R'' is a number selected from the group consisting of hydrogen, alkyl radicals containing from one to twelve carbon atoms as above defined and cycloalkyl radicals containing from five to twelve carbon atoms as defined below.

Suitable cycloalkyl radicals include those having from five to twelve carbon atoms in the carbocyclic ring. Thus, for example, cyclopentyl, cyclohexyl, cyclooctyl, cyclodecyl, and cyclododecyl are suitable cycloalkyl radicals. Additionally, within the scope of the term "cycloalkyl radical" and suitable for the process of the present invention are those cycloalkyl radicals, as herein before defined which have one or two lower alkyl (one to five carbon atoms) radicals substituted on the carbocyclic ring, such as ethylcyclopentyl, dibutylcyclohexyl methylcyclododecyl and isopropylcyclooctyl.

The term "amino substituted cycloalkyl radicals" as used herein and in the appended claims is used to define a cycloalkyl radical containing from five to twelve carbons as herein before defined wherein an amino group has been substituted for one of the hydrogens on the carbocyclic ring. The amino group may be substituted or unsubstituted. Thus, the "amino substituted cycloalkyls" correspond to the following general formula:

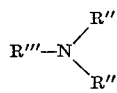

wherein R''' is the cycloalkylene radical corresponding to the cycloalkyl radical as hereinabove defined, and R'' is, as defined above, a member selected from the group consisting of hydrogen, alkyl radicals containing from one to twelve carbon atoms as above defined, and cycloalkyl radicals containing from five to twelve carbon atoms as hereinbefore defined. Thus, suitable amino substituted radicals are, for example, aminocycloheptyl, methylaminocyclopentyl, diethylhexylaminocyclododecyl, cyclohexylaminomethylcyclohexyl, dodecylaminocyclohexyl and isopropylaminocyclooctyl.

These above described alkaline earth metal amide isomerization catalysts may be prepared by any suitable method known to the art. These methods are derived from two generalized preparative methods of forming these types of amides. The first of these methods involves the direct reaction of the alkaline earth metal with the nitrogen compound, i.e., ammonia or the primary or secondary amine. The second general method involves the reaction of the inorganic amide, such as calcium amide, with the organic amine, i.e., the primary or secondary amine, whereby the inorganic amide grouping ($NH_2$—) is displaced by the organic amide grouping derived from the primary or secondary amine.

The alkaline earth metal amide isomerization catalyst may be dispersed upon a suitable inert support material, such as a clay, diatomaceous earth and α-alumina, and used in this form to catalyze the reaction. Additionally, the alkaline earth metal amide may be incorporated with known isomerization catalysts, such as sodium on alumina, and used in this manner as the isomerization catalyst.

In the process of the present invention the above-discussed alkaline earth metal amides are employed in a mole ratio of catalyst to cycloalkadiene of from about 0.05 to 1 to about 20 to 1, preferably within the range of from about 0.1 to 1 to about 10 to 1.

The reaction time is essentially a function of the reaction temperature and the ratio of isomerization catalyst to cycloalkadiene, and hence will vary according to these. In a batch process suitable results have been obtained using reaction times of approximately eighteen hours, although it is preferred to use reaction times of from about one hour to about three hours. In a continuous process shorter reaction times are preferred.

The cycloalkadienes which may be isomerized from an isomer having a least thermodynamically favored energy state to an isomer having a more thermodynamically favored energy state in accordance with the subject process, correspond to the following general formula:

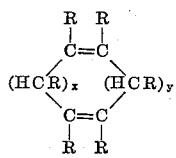

wherein R is a member selected from the group consisting of hydrogen and lower alkyl radicals, $x$ and $y$ are numbers the sum of which is equal to $n-4$, and $n$ is an integer having a value of from 6 to 12 inclusive. Thus, the cycloalkadienes isomerizable by the subject process have an empirical formula of $C_nHR_{2n-5}$, wherein $n$ and R have the meanings given above.

The subject isomerization process can be effected in either a continuous or a batch-wise process. For large scale industrial use, a continuous process is preferred over the batch-wise process. When the isomerization process is effected in a batch-wise process a solvent may be used, although the use of a solvent is not mandatory. When a solvent is desired an inert aliphatic saturated hydrocarbon or ether may be used. The term ether as used here and in the appended claims is used to define, cyclic and acyclic ethers, including mono- and polyethers having from about 2 to about 20 carbon atoms, and mono- and polyhydroxy compounds having from about 2 to about 14 carbon atoms. Representative examples of suitable inert ethers include diisopropyl ethers dioxane, didecyl ether, the dimethyl ether of ethylene glycol, tetrahydrofuran. A mixture of two or more of the above materials may be used as the solvent.

The term aliphatic saturated hydrocarbon as used herein and in the appended claims is used to define saturated aliphatic hydrocarbon, either branched or straight chain having from about 5 to about 12 carbon atoms, and mixtures of these. Representative examples of suitable inert aliphatic saturated hydrocarbons include, among others, hexane, heptane, isoheptane, ethylpentane, the octanes, the decanes, various petroleum hydrocarbon fractions, and the like.

The amount of said ether or aliphatic hydrocarbon solvent employed in the subject process in an amount sufficient to give a solvent to cycloalkadiene mole ratio within the range of from about 1 to 1 to about 20 to 1, preferably from 3 to 1 to 6 to 1.

It is, of course, to be understood that in the subject isomerization process, that in some cases the product will consist of mixtures of the thermodynamically favored isomers, rather than complete conversion to only one specific isomer. Naturally, this is principally dependent upon the particular cycloalkadiene being used. Thus, for example, with a cyclooctadiene the more favored isomer is the 1,3-form, as shown in Example I, below, when 1,5-cyclooctadiene is isomerized, the product consists of about 97% of the more stable 1,3-form. However, with the cycloundecadienes the thermodynamically favored isomer is not as clear cut and is somewhat dependent upon the temperature. At about 30° C. the most favored cycloundecadiene is a mixture having approximately 75% of the 1,4-isomer, while at about 120° C. the more thermodynamically favored is an approximate 5:3 ratio of the 1,5- and 1,6-isomers.

The cycloalkadiene to be isomerized should be relatively pure, although it may contain small amounts of impurities inherently present in these type compounds. When the cycloalkadienes contain significant amounts of materials which will react with the alkaline earth metal amides and thereby inactivate these catalysts, the cycloalkadienes should be pretreated to remove these impurities before being contacted with the catalytic material. Thus, impurities such as acetylenes, sulfur, oxygen, water, carbon dioxide and phenols, should be removed or reduced in quantity, for instance to below ten parts per million before the cycloalkadiene is contacted with the amide catalysts. These impurities may be removed or reduced by pretreating the cycloalkadienes with materials such as, alkyl aluminium, silica gel, alumina, molecular sieves, calcium sulfate, sodium hydroxide, potassium hydroxide and calcium hydride.

A variety of methods may be used to effect the recovery of the isomerized cycloalkadiene, the final choice of recovery method being principally dependent upon the reaction conditions, and the catalytic material and solvent, if any, used. For example, when a continuous fixed bed process, in the absence of a solvent, is used, no particular purification process is needed. However, when a batch process is used, particularly when a solvent is employed, purification and recovery of the isomerized product is desirable. In general, the alkaline earth metal amide catalyst is first decomposed by the addition of water or dilute acid to the cooled reaction, the decomposed reaction mixture is then extracted with sufficient aqueous acid to solubilize and remove the basic material present, particularly when substituted alkaline earth metal amides are used, followed by separation of the organic and aqueous phase by extraction with a suitable lower boiling solvent, such as ether or a low boiling hydrocarbon solvent. Further purification may then be conveniently affected by procedures utilizing the differences in the boiling points of the isomerized cycloalkadiene to be purified and the impurities to be removed.

I claim:

1. A process for the catalytic isomerization of a cycloalkadiene having an empirical formula of $C_nHR_{2n-5}$ wherein $n$ is an integer having a value of from 6 to 12 inclusive and R is a member selected from the group consisting of hydrogen and (lower) alkyl radicals and corresponding to the general structural formula:

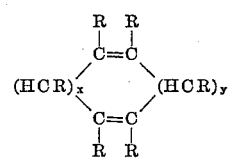

wherein R has the meaning given above, and $x$ and $y$ are numbers the sum of which is equal to $n-4$, to a structural isomer having a more thermodynamically favored energy state which comprises the steps of (1) effecting said isomerization in a reaction mixture having a composition selected from the group consisting of (a) a reaction mixture consisting essentially of an alkaline earth metal amide and said cycloalkadiene and (b) a reaction mixture consisting essentially of an alkaline earth metal amide, said cycloalkadiene, and an inert solvent selected from the group consisting of an aliphatic saturated hydrocarbon and an ether and (2) recovering the isomerized cycloalkadiene.

2. A process for the catalytic isomerization of a non-conjugated cyclooctadiene to a 1,3-cyclooctadiene which comprises the steps of (1) effecting said isomerization in a reaction mixture having a composition selected from the group consisting of (a) a reaction mixture consisting essentially of an alkaline earth metal amide and said cyclooctadiene and (b) a reaction mixture consisting essentially of an alkaline earth metal amide, said cyclooctadiene, and an inert solvent selected from the group consisting of an aliphatic saturated hydrocarbon and an ether and (2) recovering the isomerized cyclooctadiene.

3. The process of claim 1, wherein a cyclododecadiene is isomerized to its conjugated form, a 1,3-cyclododecadiene.

4. The process of claim 1, wherein a cyclodecadiene is isomerized to its unconjugated form, a -1,6-cyclodecadiene.

5. The process of claim 1, wherein a cyclononadiene is isomerized to its unconjugated form, a -1,5-cyclononadiene.

6. A process for the catalytic isomerization of a cycloalkadiene having an empirical formula of $C_nHR_{2n-5}$ wherein $n$ is an integer having a value of from 6 to 12 inclusive and R is a member selected from the group consisting of hydrogen and (lower) alkyl radicals and corresponding to the general structural formula:

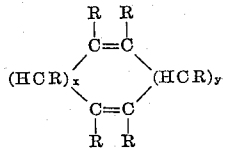

wherein R has the meaning given above, and $x$ and $y$ are numbers the sum of which is equal to $n-4$, to a structural isomer having a more thermodynamically favored energy state which comprises the steps of (1) effecting said isomerization in a reaction mixture consisting essentially of an alkaline earth metal amide and said cycloalkadiene, and (2) recovering the isomerized cycloalkadiene.

7. A process for the catalytic isomerization of a 1,5-cyclooctadiene to its conjugated form, a 1,3-cyclooctadiene, which comprises the steps of (1) effecting said isomerization in a reaction mixture having a composition selected from the group consisting of (a) a reaction mixture consisting essentially of an alkaline earth metal amide and said cyclooctadiene and (b) a reaction mixture consisting essentially of an alkaline earth metal amide, said cyclooctadiene, and an inert solvent selected from the group consisting of an aliphatic saturated hydrocarbon and an ether and (2) recovering the isomerized cyclooctadiene.

8. The process of claim 6, wherein a cyclododecadiene is isomerized to its conjugated form, a 1,3-cyclododecadiene.

9. The process of claim 6, wherein a cyclodecadiene is isomerized to its unconjugated form, a 1,6-cyclodecadiene.

10. The process of claim 6, wherein a cyclononadiene is isomerized to its unconjugated form, a 1,5-cyclononadiene.

11. A process for the catalytic isomerization of a cycloalkadiene having an empirical formula of $C_nHR_{2n-5}$ wherein $n$ is an integer having a value of from 6 to 12 inclusive and R is a member selected from the group consisting of hydrogen and (lower) alkyl radicals and corresponding to the general structural formula:

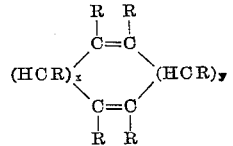

wherein R has the meanings given above and $x$ and $y$ are numbers the sum of which is equal to $n-4$, to a structural isomer having a more thermodynamically favored energy state which comprises the steps of (1) effecting said isomerization in a reaction mixture consisting essentially of an alkaline earth metal amide, said cycloalkadiene, and an inert solvent selected from the group consisting of an aliphatic saturated hydrocarbon and an ether and (2) recovering the isomerized cycloalkadiene.

12. A process for the isomerization of 1,5-cyclooctadiene to 1,3-cyclooctadiene which comprises the steps of (1) effecting said isomerization in a reaction mixture having a composition selected from the group consisting of (a) a reaction mixture consisting essentially of calcium amide and said cyclooctadiene and (b) a reaction mixture consisting essentially of calcium amide, said cyclooctadiene, and an inert solvent selected from the group consisting of an aliphatic saturated hydrocarbon and an ether and (2) recovering the isomerized cyclooctadiene.

13. The process of claim 11, wherein a cyclododecadiene is isomerized to its conjugated form, a 1,3-cyclododecadiene.

14. The process of claim 11, wherein a cyclodecadiene, is isomerized to its unconjugated form, a 1,6-cyclodecadiene.

15. The process of claim 11, wherein a cyclononadiene is isomerized to its unconjugated form, a 1,5-cyclononadiene.

References Cited
UNITED STATES PATENTS

| | | | |
|---|---|---|---|
| 3,278,618 | 10/1966 | Amagasa | 260—666 |
| 3,124,621 | 3/1964 | Crain et al. | 260—666 |

DELBERT E. GANTZ, *Primary Examiner.*

V. O'KEEFE, *Assistant Examiner.*